Sept. 15, 1953     C. A. FRANKENHOFF     2,652,152
FILTRATION METHOD
Filed June 9, 1949
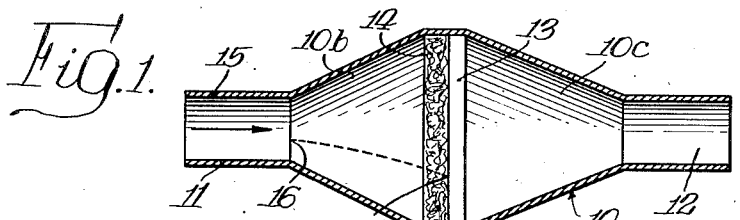
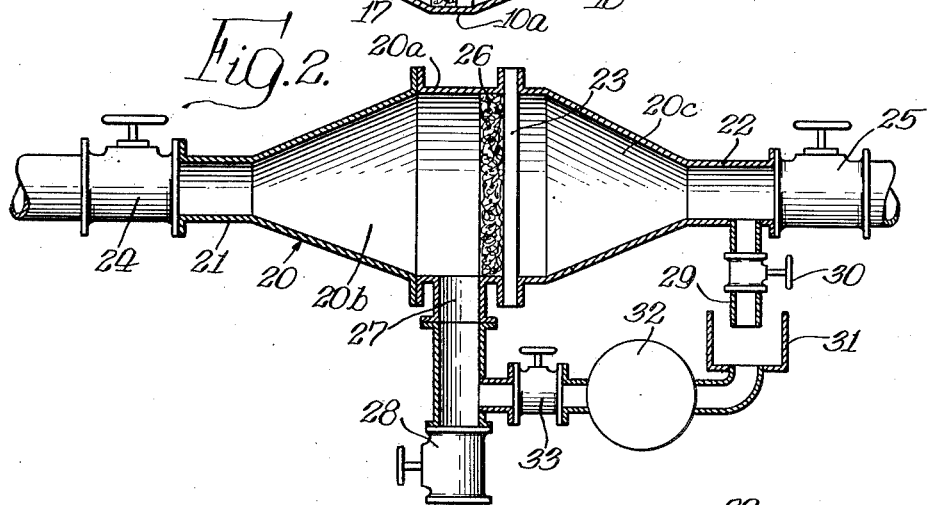
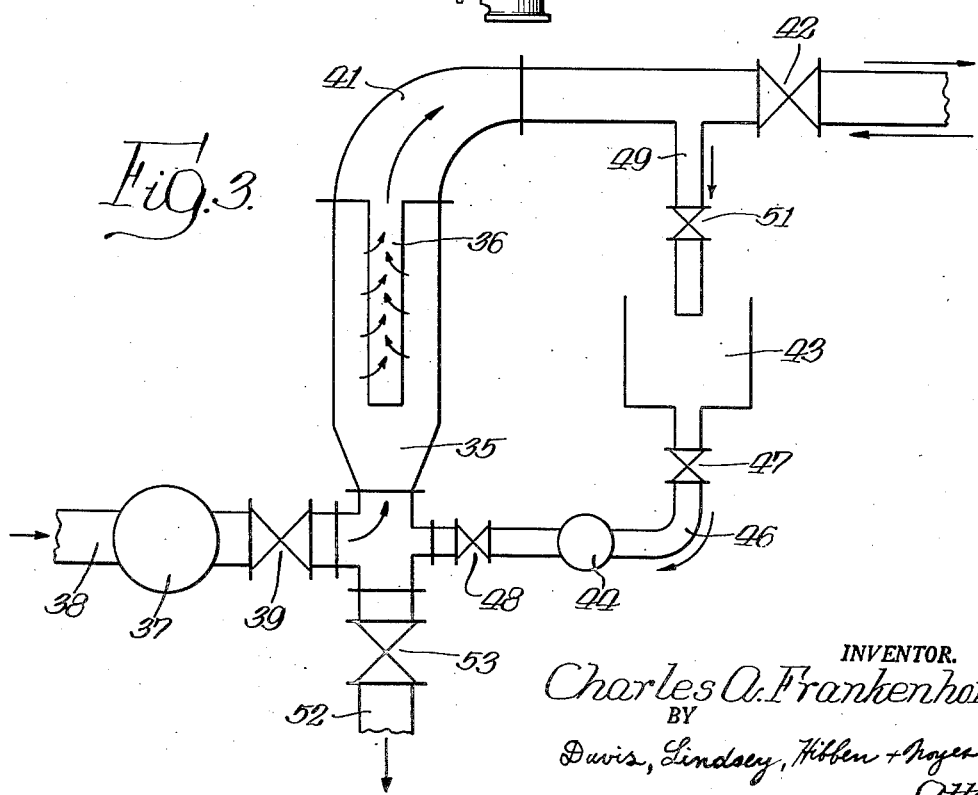
INVENTOR.
Charles A. Frankenhoff,
BY
Davis, Lindsey, Hibben + Noyes
Att'ys.

Patented Sept. 15, 1953

2,652,152

UNITED STATES PATENT OFFICE 2,652,152

FILTRATION METHOD

Charles A. Frankenhoff, Scarsdale, N. Y.

Application June 9, 1949, Serial No. 98,074

5 Claims. (Cl. 210—131)

This application is a continuation-in-part of my copending application Serial No. 538,565, filed June 3, 1944, now abandoned.

This invention relates to improvements in filtration and more particularly to an improved method of obtaining a precoat on a filter medium.

Filtering systems embodying the features of the present invention may be used for purifying water, milk, syrups, beverages or other food products which require the removal of suspended material including dead or live bacteria, for removing solid particles from various oils, greases, foods, glucoses, waxes, and chemical products, for dewatering and thickening various liquids, for separating solid material as filter cake to provide commercial products, and for various like uses.

In the pracitce of filtering processes it has been common to use screens or cloths of fine mesh as a filter medium to separate the solid particles from the liquid and, particularly where the filtrate is the desired product rather than the filter cake, it has been quite customary to use one of the so-called filter aids to improve the clarity of the product and the rate of production. These filter aids consist of finely divided chemically inert solid materials, such as powdered asbestos, paper pulp, kieselguhr, fuller's earth, talc charcoal, lime, gypsum, magnesia, diatomaceous earth, and the like.

In some filtering operations there is a tendency for some of the finer solids to pass with the filtrate through the comparatively coarse openings in the filter medium, commonly called the "cloth" or "leaf," while the larger particles remain behind and clog the openings and reduce the rate of flow of the liquid, particularly when these particles are slimy, non-rigid or of colloidal size, thus cutting down the rate of filtration. These difficulties and others, may be overcome by the proper use of a filter aid which may be utilized in two ways.

First, it may be applied to the cloth or leaf, in advance of the filtering operation, to form a "precoat," by running through the filtering apparatus a clean liquid containing the finely divided filter aid, thereby applying to the filter medium a layer of the filter aid which serves primarily to keep the cloth or leaf clean and to facilitate the removal of the filter cake at the conclusion of the filtering operation. This precoat also provides an open porous layer on the filter cloth which itself acts as a filter medium, particularly when the building up of the filter cake begins, and serves better than the cloth to remove the finer solids which are in suspension in the liquid, while at the same time preventing the sliming of the cloth and thereby insuring a cleaner cloth and a longer cloth life.

Secondly, the filter aid may be added continuously to the slurry to be filtered, which may comprise a mixture of liquids and suspended solid particles, as the slurry is fed to the filtering apparatus. The particles of filter aid are thus commingled with solid particles separated from the slurry, and the filter aid thereby maintains the desired porosity throughout the building up of the filter cake even when the cake includes materials of a slimy nature or the like which ordinarily tend to clog the pores of the filter medium and prevent the free flow of liquid therethrough. The filter aid prevents the formation of a continuous slimy surface and insures a longer cleaning cycle and a greater output. By continuous addition of the filter aid during the filtration step, a filter cake of fine porosity is obtained as the cake builds up in thickness, and solids of very small size including those of microscopic proportions, such as dead and live bacteria, may be removed with resultant high clarity and purity of the filtrate. Whether a filter aid is used or not, it is important to keep the filter cake compact, as well as porous, so that it will perform its function properly in cooperation with the filter medium.

Although the principles and features of my invention, as described hereinafter in detail, are broadly applicable to filtering processes generally, with or without the continuous addition of a filter aid, I am more particularly concerned with the first of the aforementioned methods of utilizing a filter aid, namely, by the application of the filter aid as a precoat on the filter medium prior to the passage therethrough of the slurry or material to be filtered.

In spite of the use of filter aids, it has been my observation that prior art filtration practices have been characterized by at least two major deficiencies or difficulties, namely poor or varying filtrate clarity, or low throughputs, or both. For example, a typical average filtration rate with the commercially available filter units is on the order of sixty gallons of water per square foot of filter area per hour, and a maximum throughput obtainable with such units is on the order of about two-hundred gallons per square foot per hour. With any given unit, attempts to operate at higher throughputs have resulted in major operating problems or unacceptable filtrate clarity. Where a large output has been desired under the prevailing commercial practices, multiple filter installations have been required thereby greatly increasing the investment, the operating cost, and the space occupied. With liquids having greater surface tensions than water the permissible filtering rates or throughputs have been substantially lower.

As a result of extended investigations, I have determined that two factors have been largely responsible for the relatively low flow capacity and/or poor filtrate clarity characteristic of the commercially used filtering devices: (1) the provision of undersized or restricted discharge outlets as compared with the flow capacity of the filter medium, and (2) incomplete and non-uniform deposition of the particles of filter aid or other solids on the filter medium.

Accordingly, an important object of the present invention is to overcome the above-mentioned difficulties by providing an improved filtering method and an improved filtering apparatus in which consistently satisfactory filtrate clarity is possible at a high velocity of flow and a greatly increased rate of filtration, as compared with the filtering methods heretofore employed.

A further object of the invention is to provide a filtering system having fluid discharge means of high flow capacity such as to permit free flow of filtrate away from the filter medium at even the maximum flow capacity of the filter medium.

Another object of the invention is to provide a filtering process in which solid particles are deposited substantially completely and in substantially uniform distribution on the filter medium.

An additional object of the invention is to provide a method of precoating a filter medium in which all of the foregoing objectives are achieved whereby to obtain a uniform, compact, and porous precoat on the filter medium.

Other objects and advantages of the invention will become apparent upon reference to the subsequent detailed description of the invention and the accompanying drawings in which:

Fig. 1 is a diagrammatic sectional view of one form of filtering device illustrating the principles of my invention;

Fig. 2 is a sectional view generally similar to Fig. 1 but showing the structural details of a filter chamber and associated parts embodying the principles illustrated in Fig. 1; and Fig. 3 is a diagrammatic view of a different type of filtering unit embodying the principles of my invention.

By way of explanation of the underlying principles of the present invention, reference is made first to the diagrammatic sectional view shown in Fig. 1 which comprises a filter chamber 10 into which an inlet conduit 11 discharges and which empties into an outlet or discharge conduit 12. The filter chamber 10 enlarges, as shown at 10b, from the inlet 11 toward the central part thereof, indicated at 10a, and is again reduced in diameter from the part 10a toward the outlet 12, as shown at 10c. Extending transversely across the enlarged central portion 10a is a filter medium 13 which may be in the form of a porous plate or a wire cloth or screen having a cotton cloth covering or other device of a porous nature capable of withstanding the pressure in the system and adapted to receive and support a filter cake, indicated at 14, which builds up on the inlet or upstream side of the filter medium 13 during a filtering operation.

The material or slurry to be filtered flows under pressure in the direction indicated by the arrow 15 through the inlet 11 and, because of the increased resistance offered by the filter medium 13 and the cake 14, the filter chamber 10 is enlarged, as shown at 10a in order to have a substantially increased cross-sectional area in the region where the velocity of flow decreases thereby maintaining a high throughput or flow rate. Since the solid or slimy materials are collected in the cake 14 and only the filtrate flows from the filter medium 13, and since the flow on the discharge side thereof is without restriction except for the frictional resistance of the walls of the discharge passage, it is possible again to restrict the cross-sectional area of the filter chamber in this region because the same flow rate may be maintained by increased velocity and the chamber 10 is therefore tapered toward the outlet 12, as shown at 10c.

In spite of the advent of commercial filter aids having relatively high flow rate capacities, as determined by laboratory tests, it has been found that in many cases the anticipated improved performance with such filter aids is not realized when these materials are employed in full size filter units. As a result, a frequent commercial practice has been to reduce by as much as 40% the quantity of filter aid employed in order to utilize the high capacity filter aids and still obtain practical cycle lengths. I have discovered that one of the major factors operating to limit the performance of such high capacity filter aids is the relatively restricted size and consequent low flow capacity of the outlet manifolds, conduits, and discharge passages of commercial filtering units relative to the flow capacity of the filter media in these units. As indicative of the restricted outlet construction of the prior art filters relative to the potential flow capacity of the filter media, the following data were found to be typical (the areas in each case are superficial cross-sectional areas and not true hydraulic capacities):

| Type of Filter | Ratio of leaf area to outlet area |
| --- | --- |
| Sweetland | 7,800 : 1 |
| Plate and frame | 14,000 : 1 |
| Vallez | 4,000 : 1 |
| Precoat type | 400 : 1 |

At the relatively high flow rates or throughputs which are possible with present day high capacity filter aids, for example, from about 150 to as high as about 14,000 gallons per hour per square foot of filter medium area, the restricted nature of the discharge outlets of the filter units of the above type inevitably results in a substantial back pressure against the downstream or discharge side of the filter medium, which back pressure extends through the filter medium toward its inlet surface. As a result of such back pressure, I have found that the solid particles in the slurry will not adhere properly to the filter medium or filter cake but will tend to settle to the bottom of the filter chamber. Consequently, there is frequently a complete failure to obtain a compact substantially uniform filter cake which in turn results in failure to obtain the desired filtrate clarity. Accordingly, filter units having restricted fluid outlet passages can operate satisfactorily only at moderate or relatively low flow rates.

On the basis of extended investigations, I have determined that for optimum results a filter system must be designed so that the fluid outlet from the filter chamber offers less resistance to flow, at the highest flow rate desired, than the filter medium. In practice this objective may be obtained by making the discharge pipe 12 in Fig. 1 of sufficient size or diameter to avoid any substantial back pressure on the filter medium at the highest flow rates contemplated with a liquid of the lowest surface tension contemplated.

The desired free and unrestricted flow of the filtrate away from the discharge surface of the filter cake could be insured by making the discharge passage of the same cross-sectional area throughout its length as the cross-sectional area of the filter medium measured transversely to the direction of flow but, in practice, the cross-sectional area of the discharge passage may be decreased, as shown at 10c in Fig. 1, since there is no resistance to the flow of the filtrate on the discharge side of the filter medium except the frictional resistance of the inner surface of the passage. In practice the parts should be so proportioned that there will be no back pressure at the discharge surface of the filter medium when flowing a liquid having a low surface tension at the full capacity of the inlet pipe.

An important factor determining the resistance to the flow of liquid through the filter cake and filter chamber is the surface tension of the liquid. As a practical matter, however, if the filter chamber is designed to work satisfactorily with a low surface tension liquid such as water, hydrocarbons or alcohol, it will operate satisfactorily with the more dense and more viscous liquids which are commercially encountered such as sugar syrups, and the like. The relative proportions and cross-sectional areas of the different parts of the filter apparatus may conveniently be determined by small scale tests for the purpose of insuring the absence of substantial back pressure on the discharge side of the filter cake and filter medium. For illustration, if the inlet conduit 11 and the discharge conduit 12 in Fig. 1 are each 4 inches in diameter and the filter medium 13 consists of a wire screen of 1/8" x 1/4" mesh having a single layer of cotton fabric stretched across it on the inlet side thereof, it may be found that the central portion 10a of the filter chamber can be 8 inches in diameter with the portions 10b and 10c each being 12 inches in length.

In addition to the fact that the filter chamber must be designed so that the fluid outlet therefrom offers less resistance to flow than the filter medium, as described above, there is also another important factor which must be taken into consideration in accordance with the principles of my invention. Obviously, if the existence of substantial back pressure against the discharge surface of the filter medium is detrimental and undesirable, it also follows that the existence of substantial back pressure against the discharge surface of the filter cake 14 at its interface with the filter medium 13 would also result in the same detrimental consequences. Accordingly, it is a further feature of my invention that the flow resistance of the filter medium be at all times less than the flow resistance of the precoat or filter cake which accumulates thereon. Thus, the filter cake must at all times have a greater resistance to flow than either the filter medium or the fluid outlet from the filter chamber so that, in effect, the filter cake constitutes substantially the sole resistance to flow in the system.

In order to insure the deposition on the filter medium of a precoat or filter cake of a character such that it constitutes the controlling resistance to flow in the system, I have determined that the inlet flow rate must be sufficiently high to provide a fluid velocity at the inlet or upstream side of the filter medium such that settling or segregation of the suspended particles of filter aid or other solid material is substantially prevented and said particles are thereby deposited on the filter medium in a uniform manner. Normally, a commercial filter aid contains a rather wide range of particle sizes, for example from about ½ to about 60 microns. I have found that one of the defects of prior art filtration practices has been the failure to maintain the velocity or turbulence of the inlet fluid stream sufficiently high so that even the largest size solid particles are carried to and deposited on the filter medium. It will be evident that if the inlet velocity is too low, the heavier particles will tend to settle by gravity in the inlet portion 10b of Fig. 1 and will fail to deposit on the filter medium 13. Thus, a particle entering the zone 10b at the point 16 must have sufficient velocity so that its trajectory, indicated by a dotted line, will carry it to a point 17 on the surface of the filter medium. If the inlet velocity is maintained above the critical minimum determined by the particle size range, I have found that the solid particles of filter aid or other solid material will be deposited on the filter medium in substantially uniform or homogeneous particle size distribution with the result that a uniform porous cake is formed having a substantially uniform flow resistance throughout its entire cross-sectional area. In this way, I avoid the formation or existence in the filter cake of isolated or heterogeneous areas of non-uniform particle size distribution, which non-uniform condition often results in weakened areas of materially lowered flow resistance and other highly compact areas of greatly increased flow resistance. The latter condition is conducive to channeling or selective flow distribution through the filter cake with resultant poor filtrate clarity.

By maintaining the inlet velocity high enough to insure that substantially all of the solid particles in the inlet stream are carried uniformly to the filter medium or cake and retained thereon, I obtain a favorable balance of pressure conditions in which each increment of added precoat or filter cake contributes to an increasing resistance to flow of the filter cake with the result that at all times the filter medium offers less resistance to flow than the filter cake. In other words, since the filter outlet is designed to offer less resistance to flow than the filter medium, as described above, and since by controlling the inlet fluid velocity the filter medium has at all times a resistance to flow less than the filter cake, the filter cake itself constitutes substantially the sole or controlling resistance to flow in the system.

Each of the aforementioned factors, namely, the avoidance of back pressure-producing restrictions on the outlet side of the filter and the maintenance of high inlet velocity, are closely related and are not to be considered as independent features. Thus, the utilization of a high inlet velocity to avoid settling of the solid particles on the inlet side of the filter medium would tend to aggravate or emphasize any undesirable back pressure condition which might exist in a given filter unit as a result of an unduly restricted outlet conduit. Therefore, although the proper sizing of the outlet passageways is important, per se, it becomes even more important to provide a sufficiently large and unrestricted outlet when the inlet flow rate is maintained sufficiently high to avoid settling. Accordingly, it is only by a combination of both of the underlying features of my invention that high throughputs can be obtained along with satisfactory filtrate clarity.

The foregoing principles are applicable during both a precoating step and also during the subsequent filtering step, per se, but for illustrative purposes the invention will be further described in connection with a precoating system whereby the formation of a satisfactory precoat capable of affording high throughputs and good filtrate clarity during the subsequent filtering operation is insured.

In Fig. 2 of the drawing, the filtering unit illustrated diagrammatically in Fig. 1 is represented as being embodied in a physical structure comprising a filter chamber 20 having an inlet conduit 21 and an outlet conduit 22. The filter chamber has an enlarged central zone 20ª, an inlet zone 20ᵇ, and a discharge zone 20ᶜ. A filter medium 23 in the form of a porous plate is mounted between the discharge zone 20ᶜ and the central enlarged zone 20ª. This filter medium 23 may be formed, for example, of porous stone or as a plate of porous carbon or of wire covered with cotton cloth or fabric or a fine mesh cloth woven from rubber or resin. The inlet conduit 21 has a valve 24 which may be adjusted to control the velocity of flow of the incoming material and the discharge outlet 22 has a valve 25 which may be adjusted to control the rate of flow of the filtrate leaving the filter chamber.

Assuming that the parts are properly proportioned and that the apparatus has been operating for a considerable period of time in accordance with the operating principles previously described, a uniform, compact but porous filter cake indicated at 26 will have been built up against the face of the filter medium 23. If the valve 24 is then closed, the normal pressure of the liquid on the discharge side of the filter medium 23, coupled with the force of gravity, will cause the filter cake 26 to fall downwardly from the filter medium 23 to the bottom of the chamber 20 and thence through a cake discharge opening 27 which is normally closed by a valve 28. When the cake has been discharged, the valve 28 may be closed and the operation of the apparatus for filtering purposes may be resumed. It is an important advantage resulting from the application of the principles of my invention that the filter cake may be easily displaced from the filter medium.

A precoat of filter aid on the surface of the filter medium 23 may be formed by passing water, or other liquid, containing the filter aid through the system and recirculating a part of the effluent water through the filter medium 23 until the water discharged therefrom is clear and free of particles of the filter aid. For the purpose of effecting this recirculation, the outlet conduit 22 is provided with a discharge pipe 29 controlled by a valve 30. The pipe 29 discharges into a trough 31 where the clarity of the liquid may be observed and where additional filter aid may be added as needed. A pump 32 draws the water from the trough 31 and discharges it through a valve 33 into the cake discharge conduit 27. When the water or liquid recirculation has been completed to the point where the discharging water is clear of the filter aid and a precoat of desired thickness has been formed, the valve 33 is closed gradually and at the same time the valve 24 is opened gradually to admit the slurry to be filtered. Since the precoat has been formed as a uniform porous cake with no back pressure on the filter medium or precoat during the precoating step, it is important to avoid any appreciable change in the pressure relations during the change-over from precoating to filtration proper. To this end, I prefer to effect simultaneous closing of the valve 33 and opening of the valve 24 until the precoat liquid is completely cut out and the slurry to be filtered is being introduced at approximately the same flow rate, the manipulation of the valves being accomplished gradually so that there is substantially no change in the pressure drop across the precoat and filter medium during the change-over. In this manner the pressure relations in the system are held constant and the adherence of the precoat to the filter medium is not disturbed. It will be understood, of course, that the valve 30 will be closed gradually and the valve 25 opened gradually in cooperation with the manipulation of the valves 33 and 24.

In Fig. 3 of the drawing there is illustrated diagrammatically another form of filter chamber embodying the principles of my invention. The apparatus comprises an upright cylindrical filter chamber 35 having a cylindrical-type filter medium or element 36 mounted concentrically therein. The filter element 36 may be formed from any of the materials hereinbefore mentioned in connection with the filter media indicated at 13 and 23 in Figs. 1 and 2, respectively. The slurry or other material to be filtered is pumped into the filter chamber at the bottom thereof by means of a feed pump 37 and an inlet conduit 38 provided with a control valve 39. The filter liquor passes through the cylindrical wall of the filter medium 36, as indicated by arrows in the drawing, and thence is discharged from the system through an enlarged outlet conduit 41 having a control valve 42.

In order to provide means for precoating the filter medium 36 prior to the filtering operation proper, a precoat tank 43 is provided in which a suitable slurry of filter aid in water or other clear liquid may be prepared. During the precoating operation, the suspension of filter aid is passed from the precoat tank 43 by means of a recirculating pump 44 through an inlet conduit 46 having control valves 47 and 48 into the bottom of the filter chamber 35. The precoat liquid passes through the cylindrical wall of the filter medium 36 leaving a uniform precoat deposit of filter aid on the latter and is discharged through the outlet 41. During the precoating operation the effluent liquid from the conduit 41 passes through a recirculating conduit 49 having a control valve 51 and thence into the precoat tank 43 for recirculation through the filter chamber 35.

A cake discharge outlet 52 having a valve 53 is provided below the chamber 35 for removal of the filter cake from the system. Such removal is readily effected merely by closing the valve 39 whereupon the combined effects of gravity and the hydraulic head of liquid above the filter medium 36 are sufficient to displace the filter cake from the filter medium. The filter cake then drops downwardly to the bottom of the chamber 35 for discharge through the outlet 52 and valve 53. If desired, a flow of backwash liquid can be introduced through the valve 42 and outlet 41 to insure complete removal of the filter cake. As hereinbefore described, however, backwashing is rarely necessary provided the two essential principles of my invention are followed during the precoating and filtration steps.

It will be understood that during a precoating operation the valves 39, 42, and 53 will be closed while the valves 51, 47, and 48 will be open. During a filtration operation following a precoating step the valves 48, 51, and 53 will be closed and the valves 39 and 42 will be open. During filter cake removal the valves 39, 48, and 51 will be closed while the valves 42 and 53 will be open.

As an illustration of the remarkably high throughputs which can be obtained with an apparatus of relatively small dimensions when employing the principles of my invention, the following description is presented of an actual commercial installation and embodiment of my invention.

The filter unit was of the type illustrated in Fig. 3 and comprised a cylindrical filter chamber 12 inches in diameter having a cylindrical filter medium 4 inches in diameter with an external surface area of about six square feet. The outlet pipe was 6 inches in diameter at its narrowest point. Equally satisfactory results were obtained with a porous bronze filter medium and with a cylindrical metal framework covered with a conventional filter cloth or with a synthetic plastic fabric. After the application of a precoat in accord with the principles hereinbefore disclosed, a slurry of raw river water containing an average of .25 lb. of suspended solids per thousand gallons and having added thereto about .25 lb. filter aid per thousand gallons was passed through the filter chamber.

The unit produced consistently a minimum of about 1200 gallons of filtered water per square foot of filter area per hour. The filter period ranged from two to four hours between backwashings of the filter medium to remove the accumulated filter cake. The effluent water was brilliant in color and entirely free of suspended solids. Throughputs of as high as 3000 gallons of filtered water per square foot of filter area per hour were readily obtained with the unit, but during most of the tests the valves and pressure controls were adjusted to produce a uniform flow for each cycle which was approximately 1200 gallons per square foot of filter area per hour. During a given cycle, pressure was increased gradually from five lbs. per square inch to fifty lbs. per square inch in order to maintain a constant throughput as the filter cake resistance increased. Backwashing for removal of the filter cake was accomplished easily and completely within about two minutes at five lbs. per square inch pressure provided by the head of filtered water above the filter chamber.

The excellent results thus obtained with the above-described commercial unit are accounted for by the elimination of all flow restrictions on the downstream side of the filter medium which could result in undesirable back pressure against the filter medium and by the maintenance of an inlet fluid velocity sufficiently high to insure uniform deposition of all of the solid particles on the filter medium. As a result of the combined effects of these two features of my invention, the flow resistance of the outlet passageway from the unit was always less than the flow resistance of the filter medium, and in addition, the flow resistance of the filter cake was always greater than the flow resistance of the filter medium. Thus, substantially the sole source of resistance to flow in the unit was the filter cake per se which is the fundamental objective of my invention.

Although certain forms of the invention have been shown and described by way of illustration, it will be understood that the underlying principles of my invention may be practiced by means of modified or different structures and methods within the scope of the appended claims.

I claim:

1. A filtration process which comprises forming a suspension of particles of varying size of a high flow capacity filter aid in a suspending liquid, passing said suspension in a flow path across which is interposed a filter medium, maintaining a flow rate not substantially less than about 150 gallons per hour per square foot of filter medium area whereby to provide a fluid velocity at the upstream side of said filter medium such that settling or segregation of the suspended filter aid particles is prevented and said particles are thereby deposited on said filter medium with substantially uniform particle size distribution whereby to form on said filter medium a substantially homogeneous filter cake having a substantially uniform flow resistance which is at all times greater than the flow resistance of said filter medium, said flow path being substantially unobstructed on the downstream side of said filter medium whereby back pressure is avoided at the outlet side of said filter medium at said flow rate and whereby said filter cake constitutes at all times the controlling resistance to flow in the system.

2. The process of claim 1 further characterized in that said flow rate is from about 150 to about 14,000 gallons per hour per square foot of filter medium area.

3. A filtration process which comprises passing a liquid suspension containing particles of varying size of a high flow capacity filter aid through a filter chamber having fluid inlet means, fluid outlet means, and a filter medium between said inlet means and said outlet means, at a flow rate not substantially less than about 150 gallons per hour per square foot of filter medium area whereby to provide a fluid velocity at the upstream side of said filter medium such that settling or segregation of the suspended filter aid particles is prevented and said particles are thereby deposited on said filter medium with substantially uniform particle size distribution whereby to form on said filter medium a substantially homogeneous filter cake having a substantially uniform flow resistance which is at all times greater than the flow resistance of said filter medium, said fluid outlet means being of enlarged capacity relative to the flow capacity of said filter medium and being substantially free of flow restrictions such that said outlet means possesses a flow resistance less than the flow resistance of said filter medium at said flow rate whereby back pressure is avoided at the outlet side of said filter medium and whereby said filter cake constitutes at all times the controlling resistatnce to flow in the system.

4. In the formation of a precoat on a filter medium by recirculating a liquid suspension containing filter aid particles through a filter chamber having fluid inlet means, fluid outlet means, and a filter medium between said inlet means and said outlet means, the improvement which comprises passing a liquid suspension containing particles of varying size of a high flow capacity filter aid through said filter chamber at a flow rate not substantially less than about 150 gallons per hour per square foot of filter medium area whereby to provide a fluid velocity at the upstream side of said filter medium such that settling or segregation of the suspended filter aid particles is prevented and said particles are thereby deposited on said filter medium with substantially uniform particle size distribution whereby to form on said filter medium a substantially homogeneous precoat having a substantially uniform flow resistance which is at all times greater than the flow resistance of said filter medium, the size of said fluid outlet means being sufficiently large relative to the flow capacity of said filter medium and being substantially free of flow restrictions such that said outlet means possesses a flow resistance less than the flow resistance of said filter medium at said flow rate whereby back pressure is avoided at the outlet side of said filter medium and whereby said precoat constitutes at all times the controlling resistance to flow in the system.

5. A filtration process for the removal of suspended solids from water which comprises forming a suspension in the water of particles of varying size of a high flow capacity filter aid, passing the suspension through a filter chamber having fluid inlet means, fluid outlet means, and a filter medium between said inlet means and said outlet means, at a flow rate not substantially less than about 1200 gallons per hour per square foot of filter medium area at a pressure of from about 5 to about 50 pounds per square inch whereby to provide a fluid velocity at the upstream side of said filter medium such that settling or segregation of the suspended solids and suspended filter aid particles is prevented and said solids and said particles are thereby deposited on said filter medium with substantially uniform particle size distribution whereby to form on said filter medium a substantially homogeneous filter cake having a substantially uniform flow resistance which is at all times greater than the flow resistance of said filter medium, said fluid outlet means being provided with a sufficiently large flow capacity relative to the flow capacity of said filter medium and being substantially free of flow restrictions such said outlet means possesses a flow resistance less than the flow resistance of said filter medium at said flow rate whereby back pressure is avoided at the outlet side of said filter medium and whereby said filter cake constitutes at all times the controlling resistance to flow in the system.

CHARLES A. FRANKENHOFF.

References Cited in the file of this patent

UNITED STATES PATENTS

| Number | Name | Date |
|---|---|---|
| 1,579,171 | Zoul | Mar. 30, 1926 |
| 1,703,440 | Duke | Feb. 26, 1929 |

FOREIGN PATENTS

| Number | Country | Date |
|---|---|---|
| 18,329 | Great Britain | of 1894 |